UNITED STATES PATENT OFFICE.

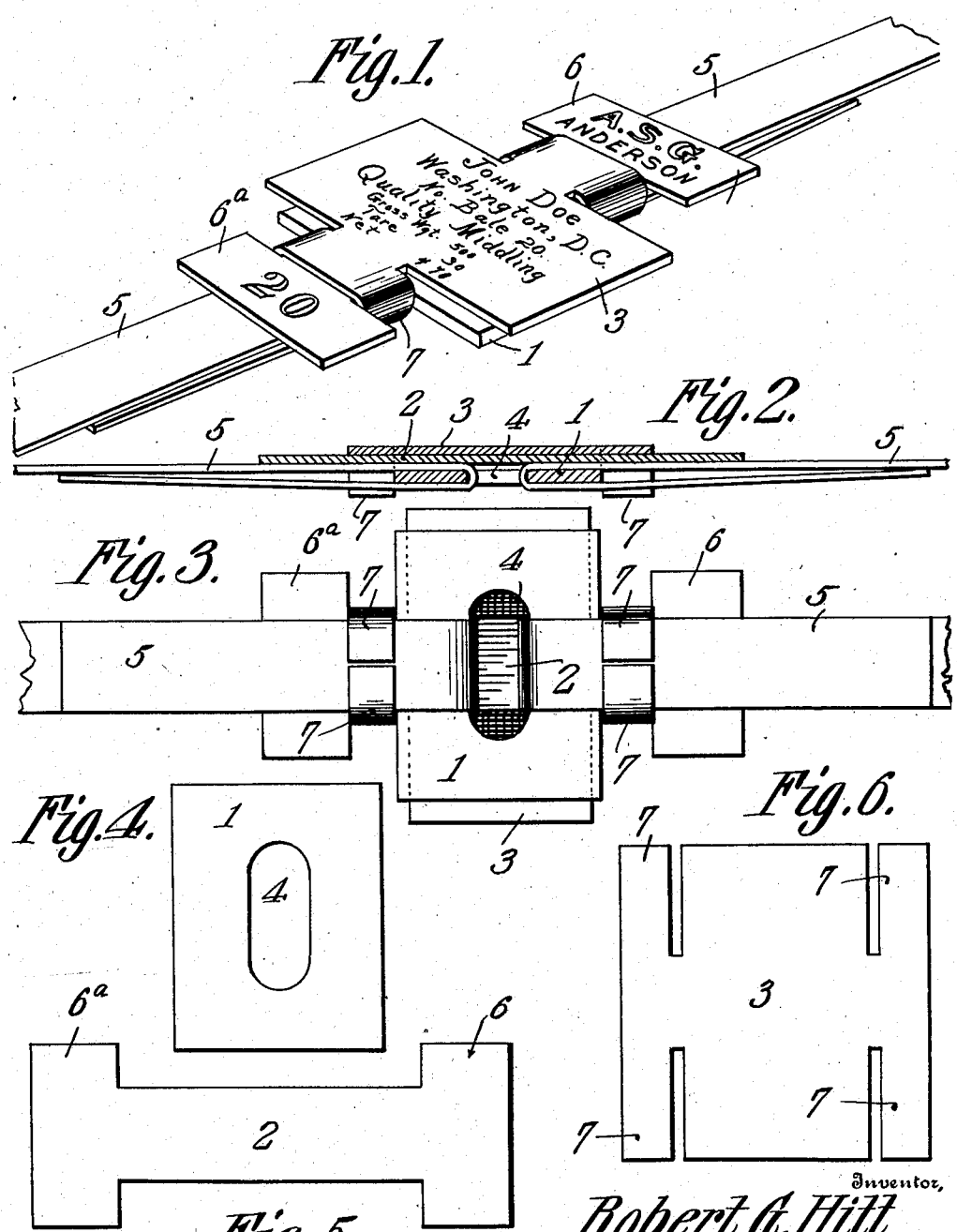

ROBERT G. HITT, OF ATLANTA, GEORGIA.

COMBINED TAG AND BUCKLE.

936,896.

Specification of Letters Patent.   Patented Oct. 12, 1909.

Application filed November 23, 1908. Serial No. 464,126.

*To all whom it may concern:*

Be it known that I, ROBERT G. HITT, a citizen of the United States, residing at Atlanta, in the county of Fulton and State of Georgia, have invented a new and useful Combined Tag and Buckle, of which the following is a specification.

This invention relates to a combined tag and buckle designed more particularly to be used on baled cotton.

The object of the invention is to provide an article of this character that shall be simple of construction, durable in use, and easy of application to position, and which shall be positive in preventing a tag from becoming disconnected from a band, whereby the loss ensuing from such accident is obviated.

With the above and other objects in view, as will appear as the nature of the invention is better understood, the same consists in the novel construction and combination of parts of a tag and buckle for bales, as will be hereinafter fully described and claimed.

In the accompanying drawings forming a part of this specification, and in which like characters of reference indicate corresponding parts:—Figure 1 is a view in perspective of a combined tag and buckle constructed in accordance with the present invention, displaying the same attached to a band. Fig. 2 is a view in vertical longitudinal section through the attachment. Fig. 3 is an inverted plan view. Fig. 4 is a view in plan of the buckle. Fig. 5 is a similar view of the inner tag. Fig. 6 is a similar view of the outer tag.

The article comprises a buckle 1, an inner tag 2 and an outer tag 3. These parts may be made of any suitable material, preferably of heavy sheet metal stamped to the appropriate shape.

The buckle 1 is provided with a longitudinal orifice 4 through which are adapted to pass the two ends of the band 5, the said ends being rebent, as clearly shown in Fig. 2, when positioned upon the bale.

The inner tag 2 is an approximate I-shaped structure and one head 6 will bear the name or initials of the consignor together with his address, and the other head 6ᵃ will bear the number of the bale or other data.

The outer tag 3 is approximately rectangular in plan and is provided with four attaching clips 7 which are formed by incising the tag in any suitable manner, and are of a size to pass practically entirely around the band, as shown in Fig. 3. Upon the outer tag will be displayed, in any suitable manner, as by stamping, embossing, or the like, the name of the consignee of the bale, his address, the number of the bale, the quality of the cotton, its gross weight, the tare, and the net weight.

In assembling the band with a bale while the same is in the press, the band is positioned around the bale and its two ends are passed through the opening 4 of the buckle, and are rebent in opposite directions, as shown in Fig. 2. The inner tag is then placed upon the band and the buckle, and the outer tag is then placed upon the inner tag, and by a suitable implement the clips 7 are bent around the inner tag and the band and firmly clamp the parts together. By preference, the distance between the inner walls of the heads 6 and 6ᵃ will be substantially equal to the length of the outer tag, and this will insure positive securing of the two tags and will also prevent any sliding movement of the parts relatively to each other.

It will be seen by the employment of the article of this invention that it will be practically impossible for a bale to go astray, as it will bear both the name of the consignor and his residence, and of the consignee and his residence, and owing to the permanent manner in which the descriptive data is displayed upon the tags, there will be no danger of it becoming defaced from any rough handling to which the bale may be subjected while being trans-shipped.

I claim:—

1. As a new article of manufacture, a bale fastener comprising a buckle, an inner tag and an outer tag, and means carried by one of the tags for holding the two tags assembled with a band.

2. As a new article of manufacture, a bale fastener comprising a buckle, an inner tag and an outer tag, and means carried by the latter tag for holding the two tags assembled with a band.

3. As a new article of manufacture, a bale fastener comprising a buckle, an approximately I-shaped inner tag, and an outer tag provided at its corners with attaching clips arranged to be bent around the inner tag and a band.

4. As a new article of manufacture, a bale fastener comprising a buckle provided with an orifice to receive the ends of a band, an approximately I-shaped inner tag, one of the heads of which is designed to receive the name and address of the consignor of a bale, and the other head to receive the number of a bale, and an outer tag provided at its corners with attaching clips arranged to be clenched around the inner tag and the band, the body portion of the outer tag having displayed thereon the name of the consignee, his address and other data relative to a bale of cotton.

In testimony that I claim the foregoing as my own, I have hereto affixed my signature in the presence of two witnesses.

ROBERT G. HITT.

Witnesses:
E. STULL,
M. C. STULL.